US012611753B2

(12) United States Patent
Zhuang

(10) Patent No.: US 12,611,753 B2
(45) Date of Patent: Apr. 28, 2026

(54) PRESSING TOOL

(71) Applicant: Quanzhou Chunsen Trading Co., Ltd., Quanzhou (CN)

(72) Inventor: Jianxiong Zhuang, Quanzhou (CN)

(73) Assignee: Quanzhou Chunsen Trading Co., Ltd., Quanzhou (CN)

( * ) Notice: Subject to any disclaimer, the term of this patent is extended or adjusted under 35 U.S.C. 154(b) by 335 days.

(21) Appl. No.: 18/459,395

(22) Filed: Aug. 31, 2023

(65) Prior Publication Data

US 2025/0073872 A1 Mar. 6, 2025

(51) Int. Cl.
*B25B 27/02* (2006.01)

(52) U.S. Cl.
CPC .................................... *B25B 27/02* (2013.01)

(58) Field of Classification Search
CPC ......... B25B 27/02; B25B 7/02; B25B 27/146; B25B 7/12; A41H 37/006
See application file for complete search history.

(56) References Cited

U.S. PATENT DOCUMENTS 263,110 A * 8/1882 Buettner ............... B25B 27/146 72/409.01
851,794 A * 4/1907 Bernard .................... B25B 7/02 81/424
974,368 A * 11/1910 Eaton ........................ B25B 7/02 29/268

FOREIGN PATENT DOCUMENTS

CN 209995958 U 1/2020
CN 214710724 U 11/2021
CN 217407908 U 9/2022

* cited by examiner

*Primary Examiner* — Jason L Vaughan
*Assistant Examiner* — Amanda Kreiling
(74) *Attorney, Agent, or Firm* — Hawaii Patent Services; Nathaniel K. Fedde; Kenton N. Fedde

(57) ABSTRACT

The present application relates to a pressing device, and more particularly to a pressing tool for pressing a first workpiece against a second workpiece. The pressing tool includes a first jaw and a second jaw rotatably connected to the first jaw, one end of the first jaw being formed with a first pressing end, the first pressing end including a pressing post and a fixing post arranged on the pressing post, the fixing post being used for positioning the first workpiece, and the pressing post being used for pressing the first workpiece against the second workpiece. One end of the second jaw is formed with a second pressing end, a position of the second pressing end is directly opposite to a position of the first pressing end, and the second pressing end includes a first positioning structure; and the pressing tool further includes a positioning portion.

17 Claims, 13 Drawing Sheets

PRESSING TOOL

TECHNICAL FIELD

The present application relates to pressing devices, and more particularly to a pressing tool.

BACKGROUND

The pressing tool may apply an external force by a user to press the two workpieces together. Typically, the configuration of the workpiece needs to be adapted to the pressing tool so that the pressing tool can position the workpiece so that the pressing tool accurately compacts both workpieces. In the related art, the structures of the workpieces are various, and each pressing tool can fit only one workpiece, resulting in that each workpiece needs to be fitted with a corresponding pressing tool, and the applicability of the pressing tool is low.

SUMMARY

The object of the present application is to provide a pressing tool capable of improving the scope of application.

In order to solve the above-mentioned technical problem, the object of the present application is achieved by the following technical solutions:

- a pressing tool for pressing a first workpiece against a second workpiece, the pressing tool including a first jaw and a second jaw rotatably connected to the first jaw, one end of the first jaw being formed with a first pressing end, the first pressing end including a pressing post and a fixing post arranged on the pressing post, the fixing post being used for positioning the first workpiece, and the pressing post being used for pressing the first workpiece against the second workpiece. One end of the second jaw is formed with a second pressing end, a position of the second pressing end is directly opposite to a position of the first pressing end, and the second pressing end includes a first positioning structure; and the pressing tool further includes a positioning portion. The positioning portion includes a second positioning structure cooperating with the first positioning structure, and the positioning portion is detachably connected to the second pressing end for placing the second workpiece and cooperating with the pressing post to press the first workpiece against the second workpiece.

In the pressing tool of the above-mentioned embodiment, the first workpiece and the second workpiece are arranged between the positioning portion and the first pressing end, the first workpiece and the second workpiece are positioned by the cooperation of the positioning portion and the fixing post, and the first workpiece and the second workpiece are connected by the pressing of the positioning portion and the pressing post. Since the positioning portion is detachably connected, the user can select different positioning portions according to different types of second workpieces, and the application range of the pressing tool is wide.

Embodiments of the present application provide a pressing tool, which is detachably connected to a second pressing end by providing a positioning portion, so that different positioning portions can be selected according to different types of second workpieces, so as to facilitate improve the applicable range of the pressing tool.

BRIEF DESCRIPTION OF DRAWINGS

In order to explain the technical solutions of the present disclosure more clearly, the following contents will briefly introduce the drawings which need to be used in the embodiments. It should be apparent that the drawings in the following description are some embodiments of the present application, and it would be obvious for a person skilled in the art to obtain other drawings according to these drawings without involving any inventive effort.

Figure 9:
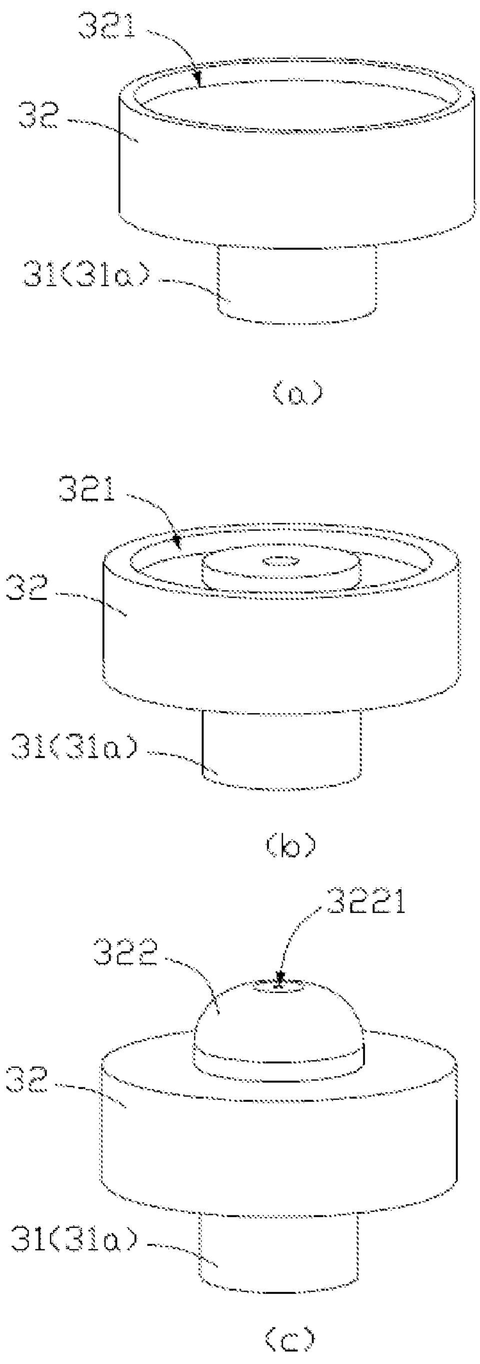

(a), (b) and (c) in FIG. 9 are three-dimensional structure views of positioning portions in different embodiments.

Figure 10:
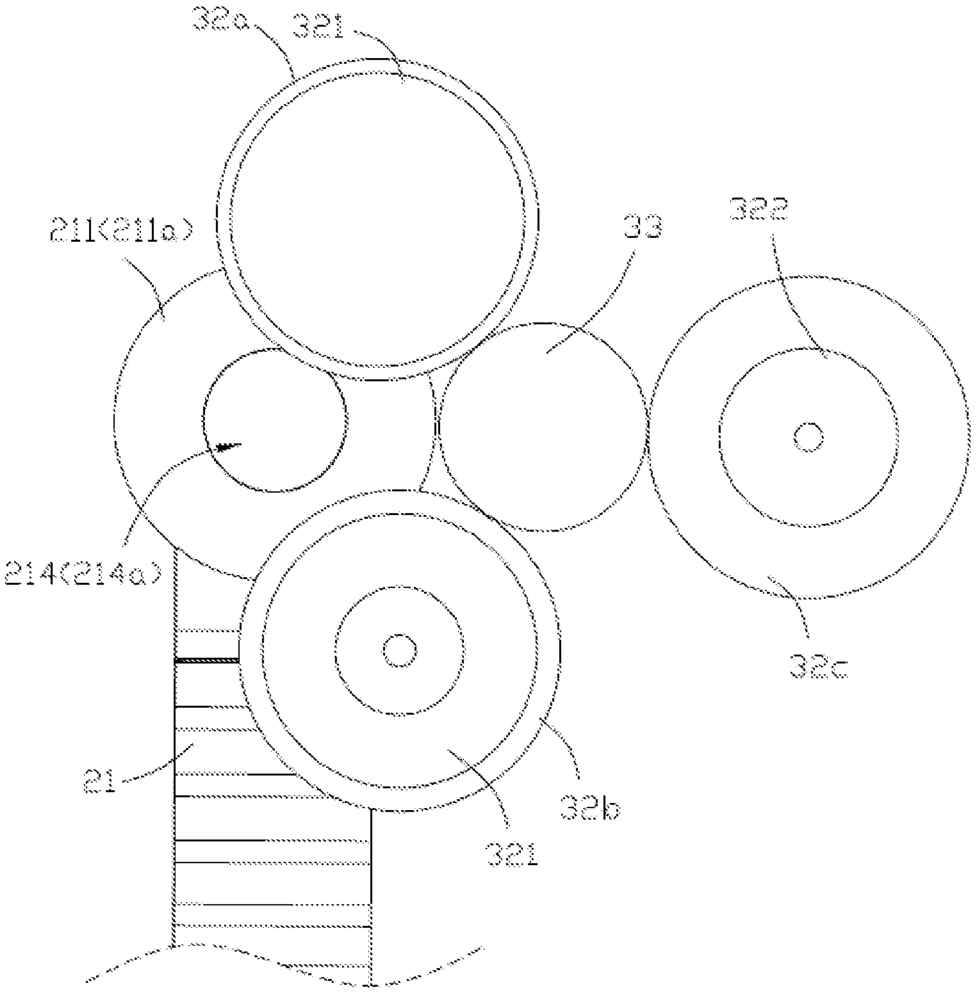

FIG. 10 is a schematic top view of the first collet and the positioning portion according to an embodiment of the present disclosure.

Figure 11:
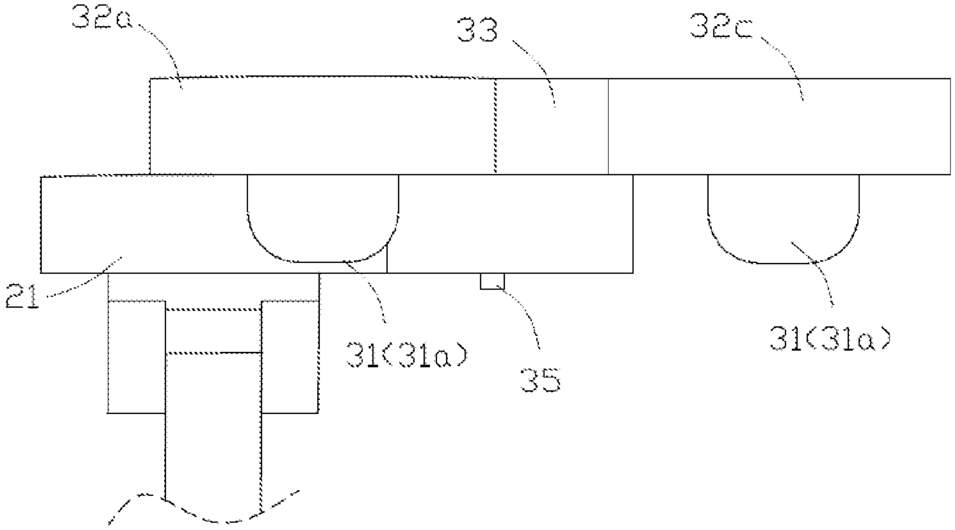

FIG. 11 is a schematic side view of FIG. 11.

Figure 12:
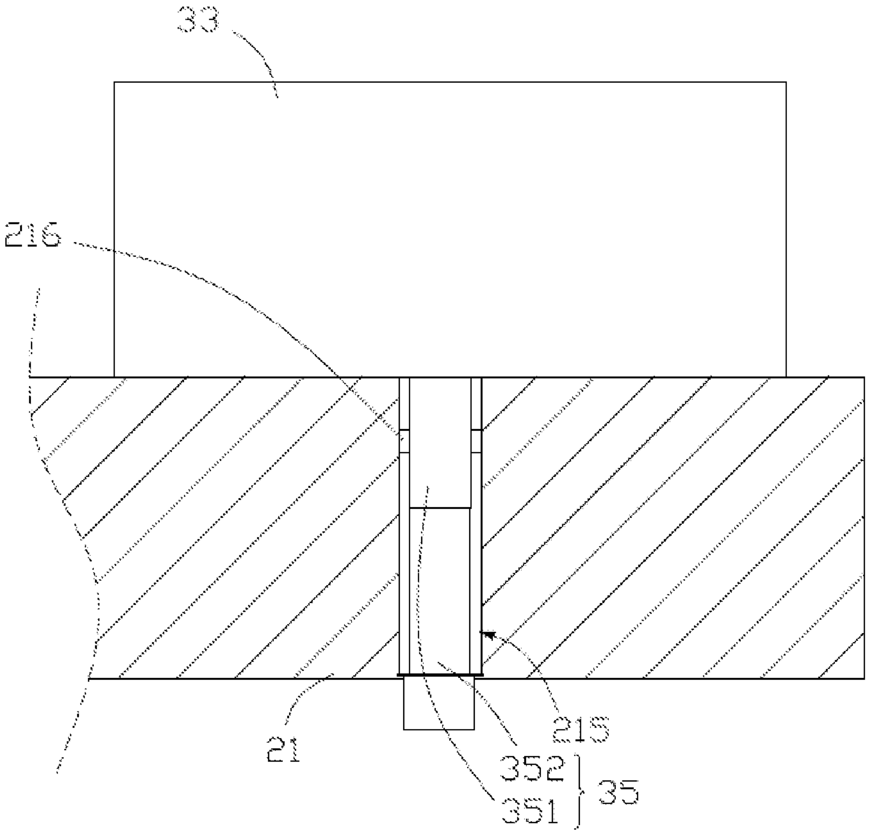

FIG. 12 is a schematic view of the first collet of FIG. 10 in connection with a disc.

Figure 13:
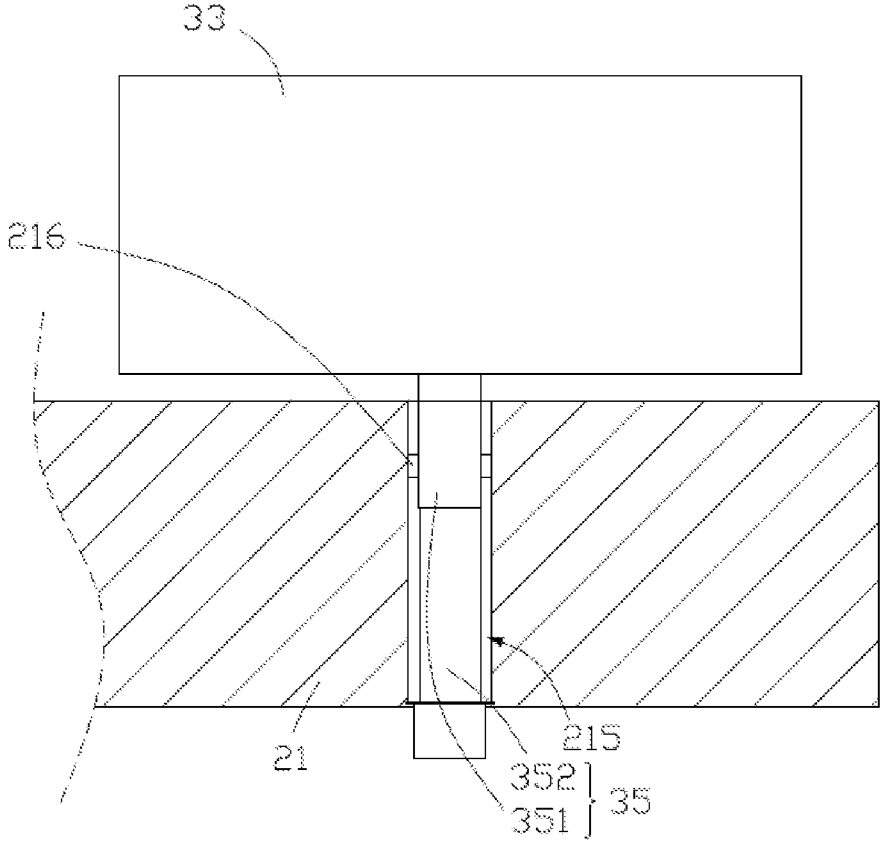

FIG. 13 is a schematic view of the connection relationship of the first collet to the disc as the threaded stud is rotated to raise the disc in FIG. 12.

- 100, pressing tool;
- 10, first jaw; 11, first collet; 111, first pressing end; 1111, pressing post; 1112, fixing post; 1113, first disc; 12, first grip;
- 20, second jaw; 21, second collet; 211, second pressing end; 211*a*, second disc; 212, first connection point; 213, second connection point; 214, first positioning structure; 214*a*, positioning hole; 215, mounting groove; 216, guide block; 22, second grip;
- 30, positioning portion; 31, second positioning structure; 31*a*, positioning post; 32, placing post; 32*a*, first placing post; 32*b*, second placing post; 32*c*, third placing post; 321, placing groove; 322, arc-shaped protrusion; 3221, engagement hole; 33, turntable; 35, rotation shaft; 351, threaded stud; 352, lifting stud;
- 40, connecting rod; 41, push block;
- 50, elastic member;
- 60, adjustment screw;
- 70, release handle;
- 80, reduction member; 81, push spring; 82, connecting plate;
- 200, first workpiece;
- 300, second workpiece.

DETAILED DESCRIPTION OF THE EMBODIMENTS

The embodiments of the present disclosure will now be described more clearly and fully hereinafter with reference to the accompanying drawings, in which embodiments of the disclosure are shown. It is to be understood that the embodiments described are a few, but not all embodiments of the disclosure. Based on the embodiments of the present disclosure, all other embodiments obtained by a person of ordinary skill in the art without inventive effort fall within the scope of the present disclosure.

It will be understood that the terms "comprise" and "include", when used in this specification and the appended claims, specify the presence of stated features, integers, steps, operations, elements, and/or components, but do not preclude the presence or addition of one or more other features, integers, steps, operations, elements, components, and/or groups thereof.

It is also to be understood that the terminology used in the description of the present application is used for the purpose of describing particular embodiments only, and is not intended to be limiting of the present application. As used in the specification and the appended claims, the singular forms "a", "an", and "the" are intended to include the plural forms as well, unless the context clearly indicates otherwise.

It should be further understood that the term "and/or" as used in the specification and the appended claims refers to and includes any and all possible combinations of one or more of the associated listed items.

Figure 6:
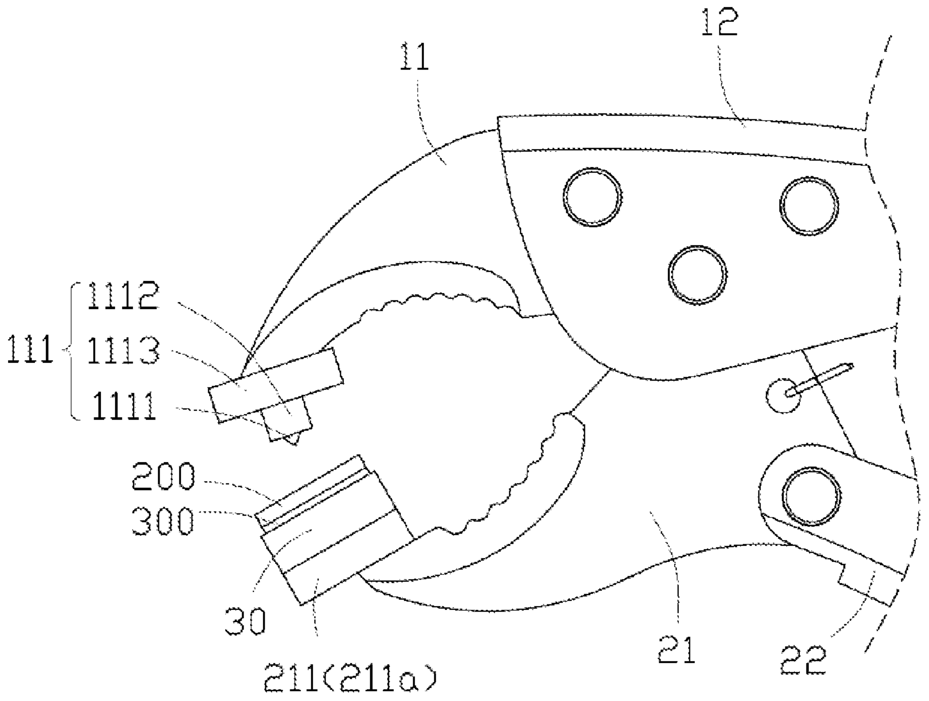
FIG. 6 is a partial view of the first collet, the second collet, the positioning portion, a first workpiece, and a second workpiece.
Figure 7:
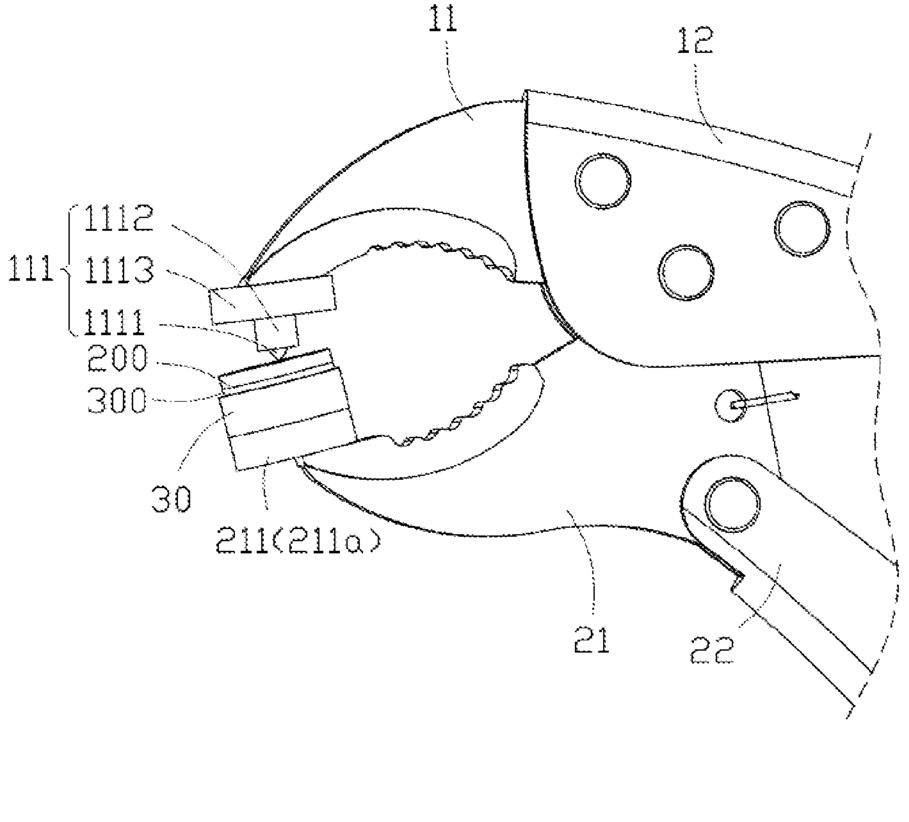
FIG. 7 is a partial view of the first collet, the second collet, the positioning portion, the first workpiece, and the second workpiece when the pressing tool is in a pressing state.

Referring to FIGS. 1, 2, 3 and 4, embodiments of the present application provide a pressing tool 100 for pressing a first workpiece 200 with a second workpiece 300 (as shown in FIGS. 6 and 7) to connect the first workpiece 200 with the second workpiece 300. The first workpiece 200 and second workpiece 300 include, but are not limited to, buttons such as buttonholes, snap-fasteners, snappers, etc.

Figure 5:
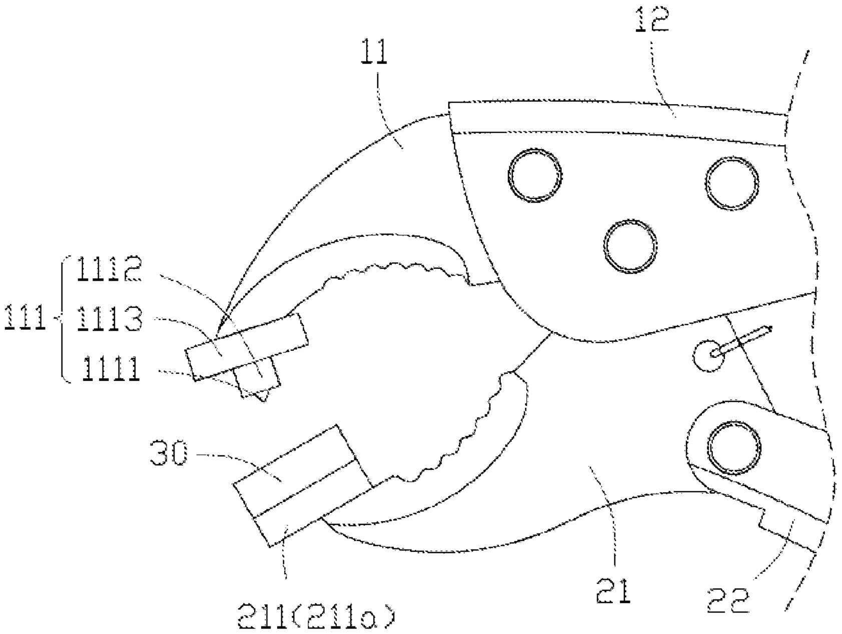
FIG. 5 is a partial view of a first collet, a second collet, and a positioning portion.

Referring to FIGS. 5, 6 and 7, the pressing tool 100 includes a first jaw 10, a second jaw 20 and a positioning portion 30. The first jaw 10 is rotatably connected to the second jaw 20, a first pressing end 111 is formed at one end of the first jaw 10, a second pressing end 211 is provided at one end of the second jaw 20, and the positioning portion 30 is detachably provided at the second pressing end 211. The first workpiece 200 and the second workpiece 300 are connected by placing the first workpiece 200 and the second workpiece 300 between the first pressing ends 111 of the positioning portions 30 and relatively rotating the first jaw 10 with the second jaw 20 so that the first pressing end 111 and the positioning portion 30 come close to each other and press the first workpiece 200 and the second workpiece 300. The different types of first workpieces 200 and second workpieces 300 are adapted by replacing the different types of positioning portions 30.

The first jaw 10 includes a first collet 11 and a first grip 12, one end of the first grip 12 is fixedly connected to the first collet 11, and an end, away from the first grip 12, of the first jaw 10 is formed with a first pressing end 111. The second jaw 20 includes a second collet 21 and a second grip 22, wherein one end of the second grip 22 is rotatably connected to the second collet 21, an end, away from the second grip 22, of the second collet 21 is formed with a second pressing end 211, and the second collet 21 is rotatably connected to the first grip 12. The connection between the second grip 22 and the connecting rod 40 is set as a first connection point 212, the connection between the second collet 21 and the second grip 22 is set as a second connection point 213, and the first connection point 212 is located on a side, away from the second pressing end 211, of the second connection point 213.

The pressing tool 100 further includes a connecting rod 40 and a resilient member 50. The connecting rod 40 is rotatably connected at one end to the first grip 12 and at the other end to the second grip 22 to control a range of rotation of the second grip 22 and the second collet 21. The resilient member 50 is connected at one end to the second collet 21 and at the other end to the first grip 12.

The pressing tool 100 has an expanded state and a pressing state, and the first workpiece 200 and the second workpiece 300 can be placed between the positioning portion 30 and the first pressing end 111 when the pressing tool 100 is in the expanded state. The first workpiece 200 and the second workpiece 300 may be pressed when the tool is in a pressing state. It will be appreciated that when the pressing tool 100 is in a pressing state, the first pressing end 111 does not necessarily contact the positioning portion 30, but may be provided that the pressing portion is spaced from the positioning portion 30, and may be adjusted as required actually.

When the pressing tool 100 is in the pressing state, the resilient member 50 is in a stretched state and applies an elastic force to the second collet 21 so that the second collet 21 is subjected to a force rotating in a direction away from the first collet 11, and an extension direction of the straight line where the first connection point 212 and the second connection point 213 are located coincides with an extension direction of the connecting rod 40 so as to block the second collet 21 from rotating in a direction away from the first collet 11.

A force is applied to the second grip 22 in a direction away from the first grip 12. The extension direction of the straight line where the first connection point 212 and the second connection point 213 are located intersects with the extension direction of the connecting rod 40); and under the elastic force of the resilient member 50, the second collet 21 can rotate in a direction away from the first collet 11, and at the same time, the second grip 22 also rotates in a direction away from the first grip 12, when the pressing tool 100 is in an open state. The connecting rod 40 is connected to the first grip 12 and the second grip 22 to block the second grip 22 from continuing to rotate in a direction away from the first grip 12. Further, when the pressing tool 100 is in a pressing state, the connecting rod 40 contacts the second grip 22 to block the second grip 22 from rotating in a direction closer to the first grip 12, so that the connecting rod 40) can control the range of rotation of the first grip 12 and the second grip 22. Alternatively, the resilient member 50 is a spring.

Optionally, in some embodiments, the pressing tool 100 further includes an adjustment screw 60 extending in a direction coincident with the extension direction of the first grip 12, the adjustment screw 60 being threadably connected to the first grip 12, the adjustment screw 60 being located at an end, away from the first collet 11, of the first grip 12. The connecting rod 40 is rotatably connected to the adjustment screw 60 such that the connecting rod 40 is rotatably connected to first grip 12 via the adjustment screw 60. The relative position of the end, away from the second grip 22, of the connecting rod 40 with the first grip 12 can be adjusted by turning the adjustment screw 60 so that the distance between the first collet 11 and the second collet 21 can be adjusted.

Taking the pressing tool 100 in a pressing state as an example, the adjusting screw 60 is rotated to move the connecting rod 40 in a direction close to the first collet 11. Since the angle between the extension direction of the first screw and the extension direction of the first grip 12 remains fixed, and the extension direction of the connecting rod 40 coincides with the extension direction of the straight line in which the first connection point 212 and the second connection point 213 are located, the second grip 22 gradually pushes the second collet 21, so that the second collet 21 gradually rotates towards the first collet 11, so as to shorten the distance between the first collet 11 and the second collet 21, which is applicable to the first workpiece 200 and the second workpiece 300 with a smaller size. Accordingly, when the adjustment screw 60 is rotated to rotate the connecting rod 40 in a direction away from the first collet 11, the distance between the first collet 11 and the second collet 21 can be increased.

Optionally, in some embodiments, the pressing tool 100 further includes a release handle 70 rotatably connected to the second grip 22, an end, away from the second collet 21, of the release handle 70 being rotatable when the pressing tool 100 is in the pressing state such that the other end of the release handle 70 pushes the connecting rod 40. When the pressing tool 100 is in the pressing state, an end, away from the first collet 11, of the release handle 70 is pushed toward the second grip 22, and an end, close to the second collet 21, of the release handle 70 pushes the connecting rod 40 so that the connecting rod 40 rotates and the extension direction of the connecting rod 40 intersects with the extension direction of a straight line where the first connection point 212 and the second connection point 213 are located. The release handle 70 is equivalent to a force-saving handle, and can make the pressing tool 100 switch from the pressing state to an opening state in a more force-saving manner.

Alternatively, in some embodiments, the connecting rod 40 is provided with a push block 41 through which the release handle 70 pushes the connecting rod 40 at an end close to the first collet 11. The push block 41 is in contact with one end of the release handle 70 to better push the connecting rod 40 to rotate when the release handle 70 is rotated.

Figure 8:
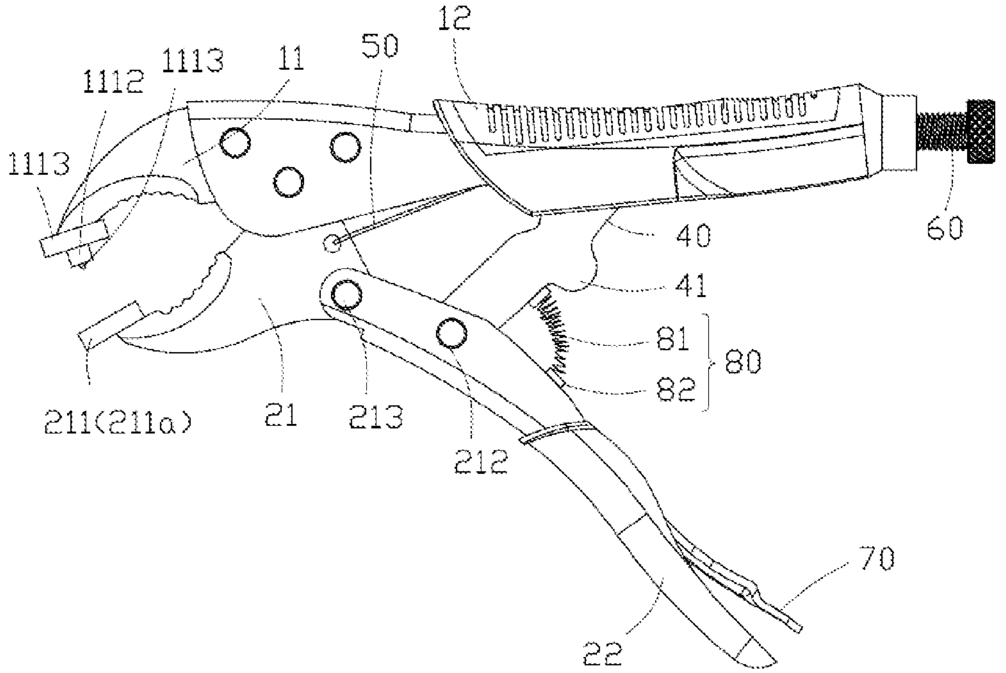
FIG. 8 is a side view of the pressing tool according to another embodiment of the present application.

Referring to FIG. 8, optionally, in some embodiments, the pressing tool 100 further includes a reduction member 80 connected at one end to the first grip 12 and at the other end to the connecting rod 40 for pushing the connecting rod 40 to place the pressing tool 100 in the expanded state. When the pressing tool 100 is in the pressing state, the connecting rod can be pushed by the elastic force provided by the reduction member 80, so that when the external force is released, the connecting rod 40 can be rotated and the pressing tool 100 can be switched to the opening state. In use, after the first workpiece 200 and the second workpiece 300 are pressed, the first workpiece 200 and the second workpiece 300 are automatically switched to the opening state, so that additional first workpiece 200 and the second workpiece 300 are placed, thereby improving the efficiency of pressing the workpieces. Alternatively, the reduction member 80 is a spring.

Alternatively, in some embodiments, the reduction member 80 is configured to be removably connected to connecting rod 40, and both ends of the reduction member 80 can be connected to first grip 12 when one end of the reduction member 80 is disconnected from connecting rod 40.

Due to the specific structure of the first workpiece 200 and the second workpiece 300, the user's usage habits, and the user's proficiency, some cases require that the pressing tool 100 is not automatically switched to the opening state after being in the pressing state. Some cases require that the pressing tool 100 automatically switch to the expanded state after being in the pressing state. The reduction member 80 is connected to the connecting rod 40 by providing the reduction member 80 to be detachably connected to the connecting rod 40, and the reduction member 80 applies an elastic force to the connecting rod 40 so that the reduction member 80 can be automatically switched to the opening state. When the reduction member 80 is not connected to the connecting rod 40, the pressing tool 100 can remain stable in a pressed state.

Alternatively, in some embodiments, the reduction member 80 includes a push spring 81 and two connecting plates 82, with one end of the push spring 81 secured to one connecting plate 82 and the other end of the push spring 81 secured to the other connecting plate 82. One connecting plate 82 is connected to the first grip 12 and the other connecting plate 82 is selectively connected to either the connecting rod 40 or the first grip 12. The pressing tool 100 can be automatically switched to the opening state when the connecting plates 82 are connected to the connecting rod 40, and can remain stable in the pressing state when both connecting plates 82 are connected to the first grip 12.

Alternatively, the connecting plate 82 is snap-fit connected to the first grip 12 and the connecting rod 40, it being understood that the connection is not limited to snap-fit connections, but may be other connections, such as magnetic attraction connections, etc.

By providing the reduction member 80, the first jaw 10 and the second jaw 20 can be rotated relative to each other or fixed relative to each other when the pressing tool 100 is in the pressing state, so that the first pressing end 111 and the positioning portion 30 press the first workpiece 200 and the second workpiece 300.

Referring to FIGS. 5, 6, 7 and 9, the first pressing end 111 includes a a pressing post 1111 and a fixing post 1112. The pressing post 1111 is arranged coaxially with the fixing post 1112, and the fixing post 1112 is located on a side, close to the second collet 21, of the pressing post 1111. The fixing post 1112 is used for positioning the first workpiece 200, and the pressing post 1111 cooperates with the positioning portion 30 to press the first workpiece 200 against the second workpiece 300.

Illustratively, the positioning portion 30 is positioned below the first pressing end 111, the second workpiece 300 is placed on the positioning portion 30, the first workpiece 200 is placed on the second workpiece 300, and then the first grip 12 and the second grip 22 are rotated relative to each other to bring the first pressing end 111 and the positioning portion 30 toward each other. The positioning portion 30 can contact the first workpiece 200 and position the first workpiece 200, and the pressing post 1111 can contact the first workpiece 200 and apply pressure to the first workpiece 200, so that the first workpiece 200 is pressed against the second workpiece 300.

It will be appreciated that the pressing post 1111 is not limited to being used to press the first workpiece 200, and that the fixing post 1112 positions the first workpiece 200, e.g. in some embodiments, the fixing post 1112 can directly press the first workpiece 200, depending on the shape of the workpiece.

It will be appreciated that the connection of the fixing post 1111 to the first collet 11 may be either a fixed connection by welding or the like to enhance the stability of the pressing post 1111, or a removable attachment by magnetic attraction, snap-fitting or the like to facilitate replacement of different types of first pressing ends 111 to accommodate different types of first workpieces 200.

Optionally, in some embodiments, the first pressing end 111 further includes a first disc 1113, the first disc 1113 being fixed to the first collet 11, the pressing post 1111 being arranged coaxially with the first disc 1113, and the pressing post 1111 being located on a side, close to the second collet 21, of the first disc 1113. Part of the type of the first workpieces 200 can contact the first disc 1113 so that the first disc 1113 applies pressure to the first workpiece 200.

The second pressing end 211 further includes a first positioning structure 214, and the positioning portion 30 includes a second positioning structure 31, wherein the first positioning structure 214 cooperates with the second positioning structure 31 so that the positioning portion 30 can be stably arranged at the second pressing end 211 and can be detachably connected to the second pressing end 211. By providing different types of positioning portions 30 on the second pressing end 211, different types of second workpieces 300 are adapted.

Figure 1:
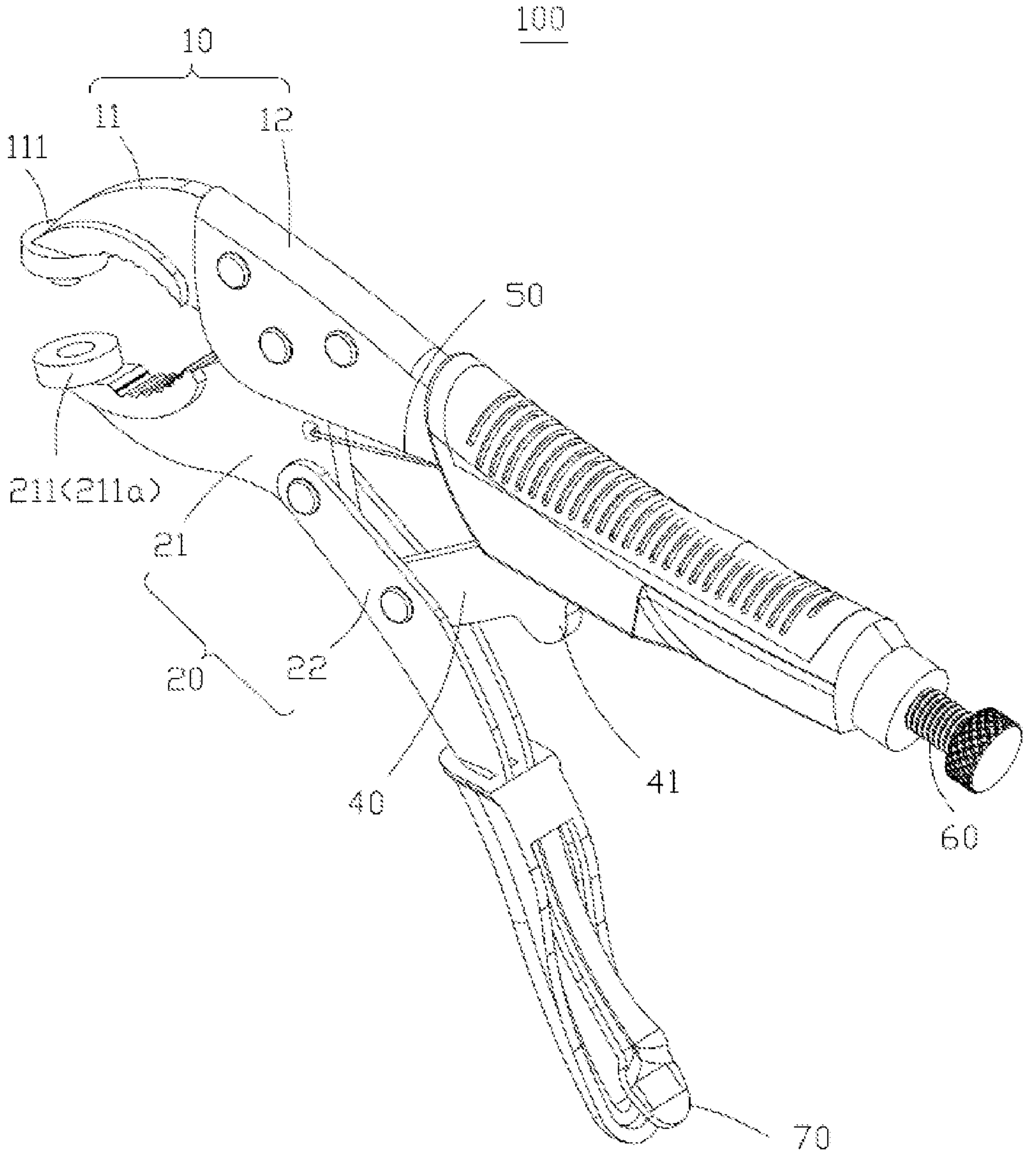
FIG. 1 is a perspective structural view of a pressing tool according to an embodiment of the present application.
Figure 2:
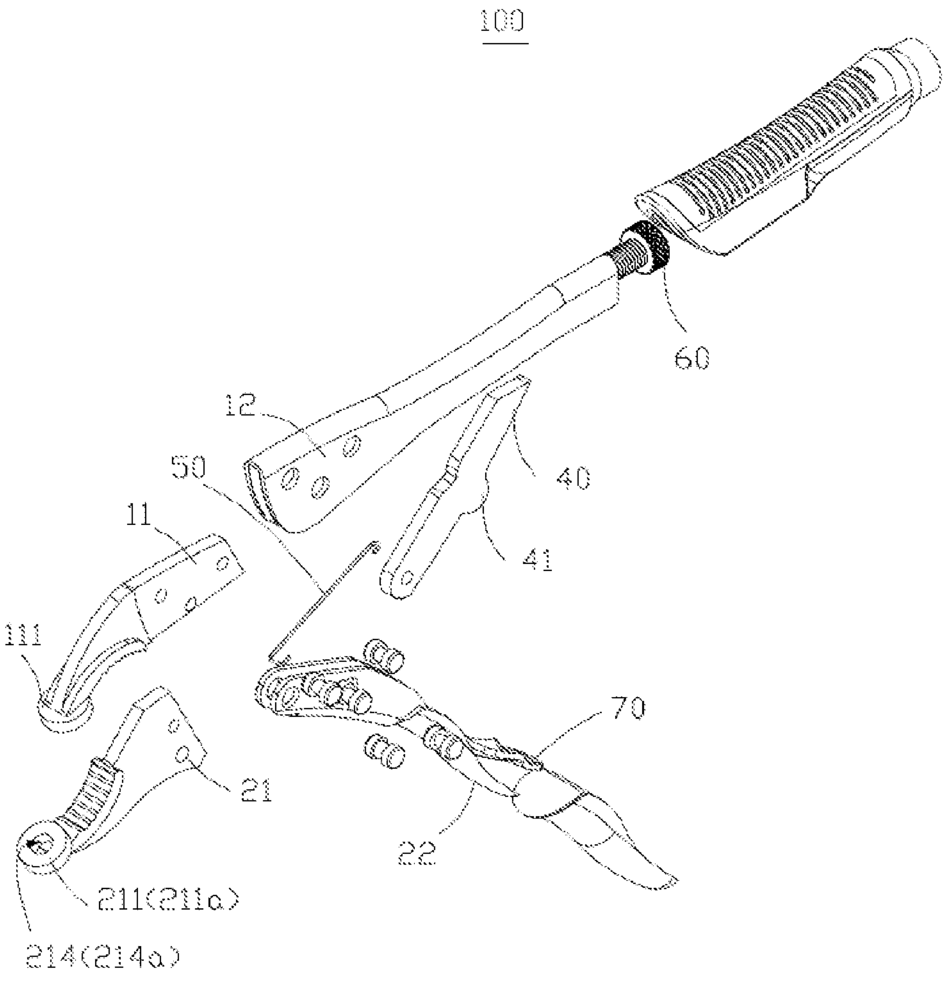
FIG. 2 is an exploded view of the pressing tool of FIG. 1.
Figure 3:
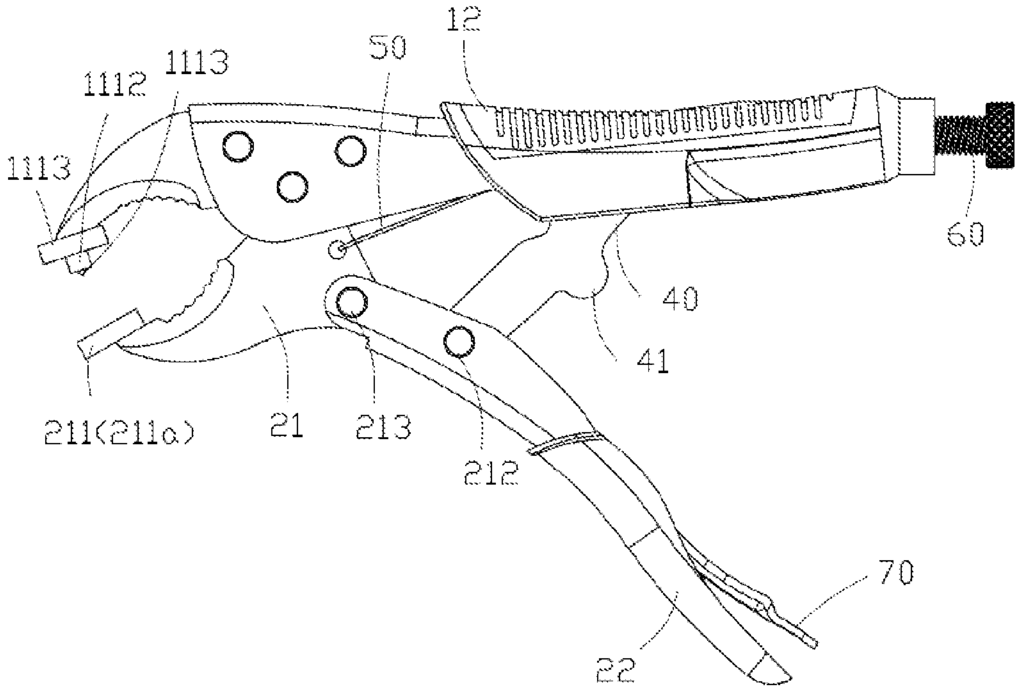
FIG. 3 is a side view of the pressing tool of FIG. 1.
Figure 4:
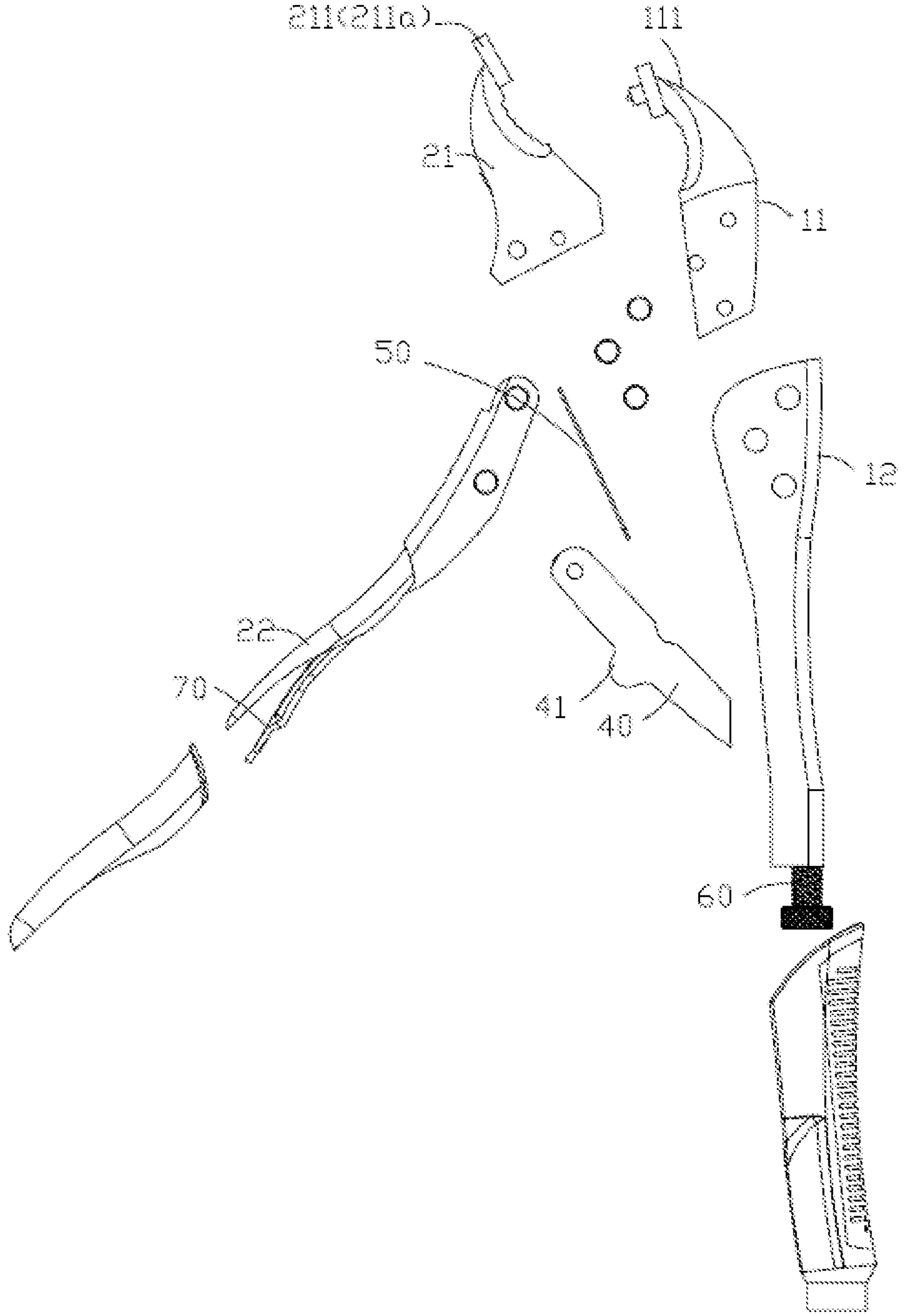
FIG. 4 is an exploded side view of the pressing tool of FIG. 1.

Alternatively, in some embodiments, the first positioning structure 214 is a positioning hole 214*a*, (as shown in FIG. 2) the second positioning structure 31 is a positioning post 31*a*, (as shown in FIG. 9) and the positioning post 31*a* can be positioned in the positioning hole 214*a* so that the positioning portion 30 can be precisely positioned at the second pressing end 211. It will be appreciated that in other embodiments, the first positioning structure 214 may be a post structure and the second structure may be an aperture structure to facilitate interaction of the first positioning structure 214 with the second positioning structure 31.

Alternatively, the second pressing end 211 is a second disc 211*a*, the second disc 211*a* is provided with a positioning hole 214*a*, and the positioning portion 30 is provided on the second disc 211*a*, with a larger contact area, so as to improve the stability of the positioning portion 30.

Optionally, in some embodiments, the positioning portion 30 further includes a placing post 32 disposed coaxially with the positioning post 31*a*, the placing post 32 being located at an end, close to the first collet 11, of the positioning post 31*a*, and the placement post 32 being used to place the second workpiece 300. The placing post 32 can have a variety of shapes to accommodate different types of workpieces.

Optionally, in some embodiments, the placing post 32 is provided with a placing groove 321 at one end close to the first collet 11, the placing groove 321 being circular in shape.

In other embodiments, the placing groove 321 is circular in shape.

It is to be understood that the shape of the placing groove 321 is not limited to a circular shape or an annular shape, but may be other such as a rectangular shape, etc.

In other embodiments, the placing post 32 is not provided with a placing groove 321, the placing post 32 is coaxially provided with an arc-shaped protrusion 322, the arc-shaped protrusion 322 is provided at an end, away from the positioning post 32*a*, of the placing post 32, the end, away from the placing post 32, of the arc-shaped protrusion 322 is provided with an engagement hole 3221, the engagement hole 3221 is engaged with the fixing post 1112, and the arc-shaped protrusion 322 is used for positioning the second workpiece 300.

In actual use, a user may select different types of positioning portions 30 according to different types of second workpieces 300, and the types of second workpieces 300 to which the pressing tool 100 can be applied are various.

Alternatively, in some embodiments, the positioning portion 30 is in magnetic attraction connection to the second pressing end 211, and when the positioning post 31*a* is positioned in the positioning hole 214*a*, the stability of the positioning portion 30 can be improved by the magnetic attraction connection, so that the second workpiece 300 can be stably placed on the placing post 32.

Referring to FIGS. 10, 11, 12 and 13 in combination, optionally, in some embodiments, the positioning portion 30 includes a turntable 33, at least two placing posts 32 disposed on a peripheral side of the turntable 33, and second positioning structures 31 equal in quantity to the placing posts 32, each placing post 32 being connected to one of the second positioning structures 31, each placing post 32 being used for placing one type of second workpiece 300, and the turntable 33 being rotated to selectively position one of the at least two placing posts 32 at the second pressing end 211.

Each of the placing posts 32 is connected to one of the second positioning structures 31 such that one of the at least two placing posts 32 is selectively disposed at the second pressing end 211 and cooperates with the first positioning structure 214 via the second positioning structure 31 to maintain the position of the positioning portion 30 stable.

Alternatively, the first positioning structure 214 is a positioning hole 214*a* and the second positioning structure 31 is a positioning post 31*a*. The positioning post 31*a* is engaged with the positioning hole 214*a*. The positioning post 31*a* is slidably connected to the placing post 32, so that the positioning post 31*a* can be retracted into the placing post 32 or extended out of the placing post 32, and the positioning post 31*a* slides in a direction of the axis of rotation of the turntable 33;

the positioning portion 30 further includes telescopic member(s), a quantity of the telescopic member(s) is consistent with a quantity of the placing post(s) 32, the telescopic member is located in the placing post 32, and one end of the telescopic member is connected to the placing post 32, while the other end of the telescopic member is connected to the positioning post 31*a* so as to push the positioning post 31*a* out of the placing post 32, and the positioning post 31*a* is capable of being retracted into the placing post 32 when the turntable 33 is rotated so as to bring the second pressing end 211 into contact with the positioning post 31*a*.

The positioning post 31*a* is located outside the placing post 32 by the elastic force of the telescopic member, and when the second pressing end 211 contacts the positioning post 31*a*, the second pressing end 211 applies an external force to the positioning post 31*a* to press the telescopic member and retract the positioning post 31*a* into the placing post 32. Thus, when the turntable 33 is rotated, the second pressing end 211 can be brought into contact with the positioning post 31*a*, so that the positioning post 31*a* is retracted into the placing post 32, and can be automatically extended to define the position of the positioning post 31*a* when the positioning post 31*a* moves to the positioning hole 214*a*. Alternatively, the telescopic member is a spring.

Alternatively, in some embodiments, an end, away from the placing post 32, of the positioning post 31*a* is arcuately disposed so that the positioning post 31*a* can be retracted into the placing post 32 when the positioning post 31*a* contacts the second pressing end 211.

At least two of the placing posts 32 include a first placing post 32*a*, a second placing post 32*b* and a third placing post 32*c* arranged circumferentially around the turntable 33, facing towards a side close to the first jaw 10, the first placing post 32*a* being provided with a circular placing groove 321, the second placing post 32*b* being provided with an annular placing groove 321, the third placing post 32*c* being provided with an arc-shaped protrusion 322, an end, away from the placing post 32, of the arc-shaped protrusion 322 being provided with an engagement hole 3221. The first placing post 32*a*, the second placing post 32*b* and the third placing post 32*c* are used for placing different types of second workpieces 300 so as to lift the applicable range of the pressing tool 100, and according to the different types of second workpieces 300, the turntable 33 is rotated so that the corresponding placing post 32 is provided at the second pressing end 211, which is simple and quick in operation.

Optionally, in some embodiments, the positioning portion 30 further includes a rotation shaft 35 disposed at the second pressing end 211, and the turntable 33 is rotatably connected to the rotation shaft 35. The rotation shaft 35 is provided coaxially with the turntable 33, and the rotation shaft 35 is provided so that the turntable 33 can stably rotate.

Optionally, in some embodiments, the rotation shaft 35 includes a threaded stud 351 and a lifting stud 352, the threaded stud 351 rotatably connected to the second collet 21 of the second jaw 20 and threadedly connected to the lifting stud 352, the lifting stud 352 being slidably connected to the second collet 21 of the second jaw 20, a sliding direction of the second collet 21 being parallel to an axis of the turntable 33, a relative position of the lifting stud 352 with the first jaw 10 being adjusted by the threaded stud 351, and the turntable 33 being rotatably connected to the lifting stud 352.

The position of the positioning portion 30 and the first jaw 10 can be adjusted by adjusting the relative position of the lifting stud 352 with the first jaw 10 by means of the stud 351. Upon encountering a first workpiece 200 and a second workpiece 300 that are large in size, the distance of the positioning portion 30 from the first jaw 10 may be increased to facilitate placement of the first workpiece 200 and the second workpiece 300. When the sizes of the first workpiece 200 and the second workpiece 300 are relatively small, the positions of the positioning portion 30 and the first jaw 10 can be shortened so as to hold the first workpiece 200 and the second workpiece 300.

Optionally, in some embodiments, the second collet 21 of the second jaw 20 is provided with a mounting groove 215, a groove wall of the mounting groove 215 is provided with a guide block 216, and a side wall of the lifting stud 352 is provided with a guide groove that cooperates with the guide block 216. The lifting stud 352 can slide along the mounting groove 215 without rotating relative to the mounting groove 215, so that the lifting stud 352 can move closer to or farther away from the first collet 11 when the stud 351 rotates.

In other embodiments, the second collet 21 of the second jaw 20 is provided with a mounting groove 215, the mounting groove 215 is rectangular in shape, the lifting stud 352 includes a square post and a cylinder, the square post is connected to the cylinder, the square post is provided in the mounting groove 215 and is threadedly connected to the threaded stud 351, and the cylinder is rotatably connected to the turntable 33. When the threaded stud 351 is rotated, since the rotation of the square post is limited by the mounting groove 215, the square post can slide in the mounting groove 215, thereby controlling the distance between the first collet 11 and the cylinder.

In summary, embodiments of the present application provide a pressing tool 100, which is detachably connected to a second pressing end 30 by providing a positioning portion 30, so that different positioning portions 30 can be selected according to different types of second workpieces 300, so as to facilitate improve the applicable range of the pressing tool 100.

Although only the specific embodiments of the present application have been described above, the scope of protection of the present application is not limited thereto, and any person skilled in the art can easily conceive various equivalent modifications or substitutions within the technical scope disclosed in the present application, and these modifications or substitutions should be covered by the scope of protection of the present application. Accordingly, the scope of protection sought herein is as set forth in the claims below.

What is claimed is:

1. A pressing tool for pressing a first workpiece (200) against a second workpiece (300), the pressing tool (100) comprising a first jaw (10) and a second jaw (20) rotatably connected to the first jaw (10), wherein one end of the first jaw (10) is formed with a first pressing end (111), the first pressing end (111) comprising a pressing post (1111) and a fixing post (1112) arranged on the pressing post (1111), the fixing post (1112) being used for positioning the first workpiece (200), and the pressing post (1111) being used for pressing the first workpiece (200) against the second workpiece (300);

one end of the second jaw (20) is formed with a second pressing end (211), a position of the second pressing end (211) is directly opposite to a position of the first pressing end (111), and the second pressing end (211) comprises a first positioning structure (214); and the pressing tool (100) further comprises:

a positioning portion (30), the positioning portion (30) comprising a second positioning structure (31) cooperating with the first positioning structure (214), and the positioning portion (30) being detachably connected to the second pressing end (211) for placing the second workpiece (300) and cooperating with the pressing post (1111) to press the first workpiece (200) against the second workpiece (300);

wherein the first positioning structure (214) is a positioning hole (214*a*), the second positioning structure (31) is a positioning post (31*a*) positioned in the positioning hole (214*a*), and the positioning portion (30) further comprises a placing post (32) connected to the positioning post (31*a*) for placing the second workpiece (300); and wherein the positioning portion (30) further comprises an arc-shaped protrusion (322) provided at an end, away from the positioning post (31a), of the placing post (32) and an engagement hole (3221) is provided at an end, away from the placing post (32), of the arc-shaped protrusion (322), the engagement hole (3221) being engaged with the fixing post (1112), the arc-shaped protrusion (322) being used for positioning the second workpiece (300).

2. The pressing tool according to claim 1, wherein an end, away from the positioning post (31*a*), of the placing post (32) is provided with a placing groove (321) for positioning the second workpiece (300).

3. The pressing tool according to claim 2, wherein the placing groove (321) has a circular shape or an annular shape.

4. The pressing tool according to claim 1, wherein the positioning portion (30) is magnetically connected to the second pressing end (211).

5. The pressing tool according to claim 1, wherein the first jaw (10) comprises a first collet (11) and a first grip (12), an end of the first grip (12) being fixedly connected to the first collet (11), an end, away from the first grip (12), of the first jaw (10) being formed with the first pressing end (111);

the second jaw (20) comprises a second collet (21) and a second grip (22), one end of the second grip (22) is rotatably connected to the second collet (21), one end, away from the second grip (22), of the second collet (21) is formed with the second pressing end (211), and the second collet (21) is rotatably connected to the first grip (12);

the pressing tool (100) further comprises:

a connecting rod (40), wherein one end of the connecting rod (40) is rotatably connected to the first grip (12), and the other end of the connecting rod (40) is rotatably connected to the second grip (22), so as to control a rotation range of the second grip (22) and the second collet (21); and a resilient member (50) connected at one end to the second collet (21) and at the other end to the first grip (12).

6. The pressing tool according to claim 5, wherein the pressing tool (100) further comprises an adjustment screw (60) threadably connected to the first grip (12), the adjustment screw (60) being located at an end, away from the first collet (11), of the first grip (12), the connecting rod (40) being rotatably connected to the adjustment screw (60).

7. A pressing tool for pressing a first workpiece (200) against a second workpiece (300), the pressing tool (100) comprising a first jaw (10) and a second jaw (20) rotatably connected to the first jaw (10), wherein one end of the first jaw (10) is formed with a first pressing end (111), the first pressing end (111) comprising a pressing post (1111) and a fixing post (1112) arranged on the pressing post (1111), the fixing post (1112) being used for positioning the first workpiece (200), and the pressing post (1111) being used for pressing the first workpiece (200) against the second workpiece (300);

one end of the second jaw (20) is formed with a second pressing end (211), a position of the second pressing end (211) is directly opposite to a position of the first pressing end (111), and the second pressing end (211) comprises a first positioning structure (214); and the pressing tool (100) further comprises:

a positioning portion (30), the positioning portion (30) comprising a second positioning structure (31) cooperating with the first positioning structure (214), and the positioning portion (30) being detachably connected to the second pressing end (211) for placing the second workpiece (300) and cooperating with the pressing post (1111) to press the first workpiece (200) against the second workpiece (300), wherein the positioning portion (30) further comprises:

a turntable (33) rotatably connected to the second jaw (20) and having an axis of rotation perpendicular to an axis of rotation of the second jaw (20); and at least two placing posts (32) being arranged on a peripheral side of the turntable (33), each of the at least two placing posts (32) being connected to a respective second positioning structure (31), each of the at least two placing posts (32) being used for placing one type of the second workpiece (300), the turntable (33) being rotated to selectively place one placing post (32) of the at least two placing posts (32) at the second pressing end (211).

8. The pressing tool according to claim 7, wherein the first positioning structure (214) is a positioning hole (214*a*), the respective second positioning structures (31) are respective positioning posts (31*a*) cooperating with the positioning hole (214*a*), the respective positioning posts (31*a*) are slidably connected to respective the placing posts (32) of the at least two placing posts (32) so that each of the respective positioning post (31*a*) is capable of being retracted into or extended out of the respective placing post (32), and the respective positioning posts (31*a*) slides in a direction of the axis of rotation of the turntable (33); and the positioning portion (30) further comprises a plurality of telescopic members, a quantity of the telescopic members is consistent with a quantity of the at least two placing post (32), each of the telescopic member is located in a respective placing post (32) of the at least two placing posts (32), and one end of each of the the telescopic members is connected to the respective placing post (32), while the other end of the telescopic member is connected to the respective positioning post (31*a*) so as to push the respective positioning post (31*a*) out of the respective placing post (32), and each of the positioning posts (31*a*) is capable of being retracted into the respective placing post (32) when the turntable (33) is rotated so as to bring the second pressing end (211) into contact with the respective positioning post (31*a*).

9. The pressing tool according to claim 8, wherein an end, away from the placing post (32), of the positioning post (31*a*) is arc-shaped.

10. The pressing tool according to claim 7, wherein the at least two placing posts (32) comprise a first placing post (32*a*), a second placing post (32*b*) and a third placing post (32*c*) arranged circumferentially around the turntable (33), facing towards a side close to the first jaw (10), the first placing post (32*a*) being provided with a circular placing groove (321), the second placing post (32*b*) being provided with an annular placing groove (321), the third placing post (32*c*) being provided with an arc-shaped protrusion (322), an end, away from the placing post (32), of the arc-shaped protrusion (322) being provided with an engagement hole (3221).

11. The pressing tool according to claim 7, wherein the positioning portion (30) further comprises a rotation shaft (35) provided at the second pressing end (211), and the turntable (33) is rotatably connected to the rotation shaft (35).

12. The pressing tool according to claim 11, wherein the rotation shaft (35) comprises a threaded stud (351) and a lifting stud (352), the threaded stud (351) being rotatably connected to the second jaw (20) and threadedly connected to the lifting stud (352), the lifting stud (352) being slidably connected to the second jaw (20) and adjusting a relative position of the lifting stud (352) with the first jaw (10) by means of the threaded stud (351), and the turntable (33) being rotatably connected to the lifting stud (352).

13. The pressing tool according to claim 12, wherein the second jaw (20) is provided with a mounting groove (215), a groove wall of the mounting groove (215) is provided with a guide block (216), and a side wall of the lifting stud (352) is provided with a guide groove cooperating with the guide block (216).

14. The pressing tool according to claim 12, wherein the second jaw (20) is provided with a mounting groove (215) having a rectangular shape, the lifting stud (352) comprises a square post and a cylinder, the square post is connected to the cylinder, the square post is provided in the mounting groove (215) and is threadedly connected to the threaded stud (351), and the cylinder is rotatably connected to the turntable (33).

15. A pressing tool for pressing a first workpiece (200) against a second workpiece (300), the pressing tool (100) comprising a first jaw (10) and a second jaw (20) rotatably connected to the first jaw (10), wherein one end of the first jaw (10) is formed with a first pressing end (111), the first pressing end (111) comprising a pressing post (1111) and a fixing post (1112) arranged on the pressing post (1111), the fixing post (1112) being used for positioning the first workpiece (200), and the pressing post (1111) being used for pressing the first workpiece (200) against the second workpiece (300);

one end of the second jaw (20) is formed with a second pressing end (211), a position of the second pressing end (211) is directly opposite to a position of the first pressing end (111), and the second pressing end (211) comprises a first positioning structure (214); and the pressing tool (100) further comprises:

a positioning portion (30), the positioning portion (30) comprising a second positioning structure (31) cooperating with the first positioning structure (214), and the positioning portion (30) being detachably connected to the second pressing end (211) for placing the second workpiece (300) and cooperating with the pressing post (1111) to press the first workpiece (200) against the second workpiece (300);

wherein the first jaw (10) comprises a first collet (11) and a first grip (12), an end of the first grip (12) being fixedly connected to the first collet (11), an end, away from the first grip (12), of the first jaw (10) being formed with the first pressing end (111);

wherein the second jaw (20) comprises a second collet (21) and a second grip (22), one end of the second grip (22) is rotatably connected to the second collet (21), one end, away from the second grip (22), of the second collet (21) is formed with the second pressing end (211), and the second collet (21) is rotatably connected to the first grip (12);

wherein the pressing tool (100) further comprises:

a connecting rod (40), wherein one end of the connecting rod (40) is rotatably connected to the first grip (12), and the other end of the connecting rod (40) is rotatably connected to the second grip (22), so as to control a rotation range of the second grip (22) and the second collet (21); and a resilient member (50) connected at one end to the second collet (21) and at the other end to the first grip (12);

wherein the pressing tool (100) further comprises a release handle (70), the release handle (70) being rotatably connected to the second grip (22), an end, away from the second collet (21), of the release handle (70) being rotatable when the pressing tool (100) is in a pressing state, such that the other end of the release handle (70) pushes the connecting rod (40), wherein the connecting rod (40) is provided with a push block (41), and an end, close to the first collet (11), of the release handle (70) pushes the connecting rod (40) through the push block (41).

16. A pressing tool for pressing a first workpiece (200) against a second workpiece (300), the pressing tool (100) comprising a first jaw (10) and a second jaw (20) rotatably connected to the first jaw (10), wherein one end of the first jaw (10) is formed with a first pressing end (111), the first pressing end (111) comprising a pressing post (1111) and a fixing post 1112) arranged on the pressing post (1111), the fixing post (1112) being used for positioning the first workpiece (200), and the pressing post (1111) being used for pressing the first workpiece (200) against the second workpiece (300);

one end of the second jaw (20) is formed with a second pressing end (211), a position of the second pressing end (211) is directly opposite to a position of the first pressing end (111), and the second pressing end (211) comprises a first positioning structure (214); and the pressing tool (100) further comprises:

wherein a positioning portion (30), the positioning portion (30) comprising a second positioning structure (31) cooperating with the first positioning structure (214), and the positioning portion (30) being detachably connected to the second pressing end (211) for placing the second workpiece (300) and cooperating with the pressing post (1111) to press the first workpiece (200) against the second workpiece (300);

wherein the first jaw (10) comprises a first collet (11) and a first grip (12), an end of the first grip (12) being fixedly connected to the first collet (11), an end, away from the first grip (12), of the first jaw (10) being formed with the first pressing end (111);

wherein the second jaw (20) comprises a second collet (21) and a second grip (22), one end of the second grip (22) is rotatably connected to the second collet (21), one end, away from the second grip (22), of the second collet (21) is formed with the second pressing end (211), and the second collet (21) is rotatably connected to the first grip (12);

wherein the pressing tool (100) further comprises:

a connecting rod (40), wherein one end of the connecting rod (40) is rotatably connected to the first grip (12), and the other end of the connecting rod (40) is rotatably connected to the second grip (22), so as to control a rotation range of the second grip (22) and the second collet (21); and a resilient member (50) connected at one end to the second collet (21) and at the other end to the first grip (12);

wherein the pressing tool (100) further comprises a reduction member (80) connected at one end to the first grip (12) and at the other end to the connecting rod (40) for pushing the connecting rod (40) to place the pressing tool (100) in an expanded state.

17. The pressing tool of claim 16, wherein the reduction member (80) is configured to be detachably connected to the connecting rod (40), and both ends of the reduction member (80) are connectable to the first grip (12) when one end of the reduction member (80) is separated from the connecting rod (40).

* * * * *